3,017,321
TRICHLOROMETHYL 2-METHOXY-5-PHOSPHONO-BENZENETHIOLSULFONATE PESTICIDES

Elizabeth M. Hardy, Hohokus, N.J., assignor to American Cyanamid Company, New York, N.Y., a corporation of Maine
No Drawing. Filed Apr. 22, 1959, Ser. No. 807,980
6 Claims. (Cl. 167—30)

This invention relates to trichloromethyl 2-methoxy-5-phosphonobenzenethiolsulfonate of the formula:

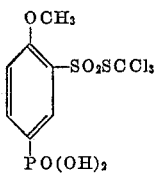

and to a method of its preparation.

The present invention relates to nematocidal and fungacidal compositions containing the above compound and to the use of such compositions in inhibiting the growth of certain fungi and for controlling nematodes in the soil.

Heretofore, acids of phosphorus, including phosphonic acids, have been used primarily as insecticides. The new compound of this invention is not an insecticide and the discovery of the nematocidal properties of this compound was not obvious because there is no known correlation between the structure of a compound and its nematocidal properties. Nematodes are not insects and are not classed as insects and nematocides are not classed as insecticides by the United States Department of Agriculture.

The novel compound of this invention may be prepared by starting with 4-methoxybenzenephosphonic acid which is reacted with chlorosulfonic acid to form 3-chlorosulfonyl-4-methoxybenzenephosphonic acid, which is reduced by sodium sulfite to the sodium sulfinate according to the following reaction scheme:

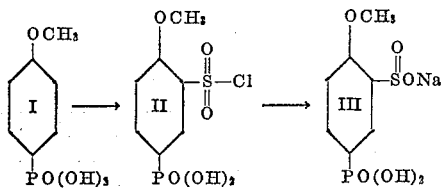

The corresponding sodium sulfinate under alkaline conditions is then reacted with perchloromethylmercaptan to form the new trichloromethyl 2-methoxy-5-phosphono-benzenethiolsulfonate of this invention according to the following equation:

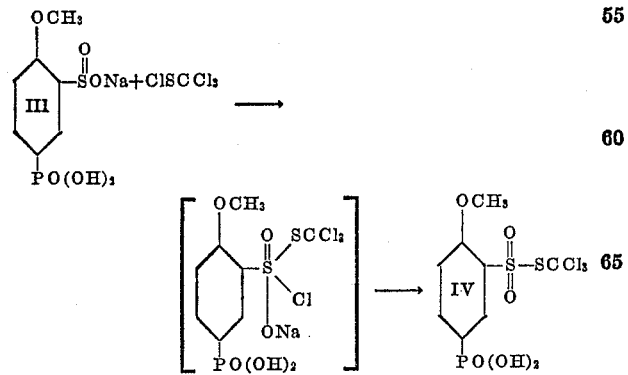

Alkaline conditions are maintained to prevent formation of the free sulfinic acid

which occurs in acid solution. The final product is a white crystalline solid, insoluble in water, sintering at 154° C. and melting at 166–168° C.

Compounds II and III are useful intermediates for the preparation of the final compound and are also part of this invention. The free acid of (II) can also be used as a starting material for the preparation of the final product of this invention. It is formed from the sodium salt by reaction with a strong acid and can be converted to the sodium or potassium salt by reaction with an alkali metal hydroxide. The free sulfinic acid may also be nitrated and the nitro group reduced to amino to form a dyestuff intermediate.

The new compound is an effective nematocide in concentrations as low as 0.01%. The compound may be applied alone to the soil, or it may be formulated on granules for application with a conventional fertilizer spreader, as an emulsifiable concentrate or wettable powder for application with sprayers, as a dust for application with a conventional duster, or adsorbed on activated carbon for application to seeds.

It is an advantage of the present invention that the nematocidal compound is effective when employed in dilute concentrations. It is preferred, therefore, to incorporate the compound in a variety of suitable solid or liquid carriers or diluents. Such compositions can be prepared either as a suspension in a suitable non-solvent or as a dust. A suspension or dispersion of the nematocidal compound in a non-solvent such as water may be prepared for direct application to infested soils. Alternatively, a prepared suspension of the compound may be modified by the addition thereto of small amounts, usually from about 1 to about 5 parts, of a commercially available dispersing or surface active agent per 100 parts of the nematocidal compound. Examples of surface active compounds are the sodium salt of polymerized propyl naphthylene sulfonic acid (Daxad 11), an alkyl aryl polyether alcohol (Triton X–100), and a modified phthalic glycerol alkyd resin (Triton B–1956).

In the preparation of dusts, the nematocidal compound may be admixed with a finely-divided inert granular material as a carrier in any conventional manner. Useful carriers include kaolin, bentonite, talc, pumice, silica, chalk, wood flour, fuller's earth, activated carbon, charcoal and the like.

0.01% to 0.1% suspensions of the new compound in water are 100% effective in killing nematodes such as Anguillula or fungus spores such as Macrosporium sarcinaeforme or Sclerotinia fructigena. Greater concentrations than 0.01% are not advisable when treating plants since concentrations of 0.1% are known to have some phytotoxic action. Concentrations of 0.01% are harmless to plants.

The invention will be described in greater detail in conjunction with the following specific examples in which the parts are by weight unless otherwise specified.

EXAMPLE 1

*Preparation of 3-chlorosulfonyl-4-methoxybenzene-phosphonic acid*

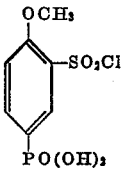

To 100 parts by volume of chlorosulfonic acid at 10–25° C., are added gradually, 35 parts of 4-methoxybenzenephosphonic acid. The solution is then gradually warmed to 90° C. and maintained at that temperature for three hours. It is then cooled to room temperature and drowned on crushed ice with stirring to give a white slurry. The product is isolated by filtration, washed with ice water and dried under vacuum. Yield is 29 parts of 3-chlorosulfonyl-4-methoxybenzenephosphonic acid having a S.P. 134° C. and M.P. 138–140° C. dec.

EXAMPLE 2

*Preparation of trichloromethyl 2-methoxy-5-phosphonobenzenethiolsulfonate*

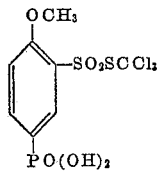

To 17.2 parts of 3-chlorosulfonyl-2-methoxybenzenephosphonic acid in 45 parts of ice water is added a solution of 11.3 parts of sodium sulfite in 45 parts of water. With cooling to keep the mixture below 20° C., a 5 N sodium hydroxide solution is added until a slightly alkaline solution is obtained. An alkaline solution of sodium 2-methoxy-5-phosphonobenzenesulfinate is thus formed. At 5–10° C., 11.0 parts of perchloromethylmercaptan is added gradually. The white crystalline product formed is isolated by filtration, washed with hot water and dried. M.P. 166–168° C. (dec.).

*Analysis.*—Calculated for $C_8H_8Cl_3PS_2O_6$: C, 23.9; H, 2.0; Cl, 26.4; S, 15.9; P, 7.7. Found: C, 22.3; H, 2.02; Cl, 26.2; S, 15.2; P, 7.43

EXAMPLE 3

An aqueous suspension of 100 Anguillula nematodes in 4 cc. of water is placed in a vial containing 0.01% of the compound of Example 2. The vial is rotated for twenty-four hours. At the termination, the percent kill of nematodes is 100%.

EXAMPLE 4

An aqueous suspension of 100 Anguillula nematodes in 4 cc. of water is placed in a vial containing 0.1% of the compound of Example 2. The vial is rotated for twenty hours. At the termination, the percent kill of nematodes in the vial is 100%.

EXAMPLE 5

The compound in this invention is tested for fungicidal activity on spores of *Macrosporium sarcinaeforme* and *Sclerotinia fructigena* according to the following procedure: Spores of each fungus are washed from the agar slants with distilled water, and are adjusted to a concentration of approximately 50,000 spores per cc. of water. For each fungus species, 0.25 cc. of spore suspension together with 0.01% of the product of Example 2 in water are added to separate 4 cc. vials. The vials are rotated to provide intimate contact of the chemical and organism. After a 20-hour exposure period, the spores are removed from the vials, and are examined microscopically to determine percent germination. The inhibition of spore germination in both vials is 100%.

I claim:
1. Trichloromethyl 2-methoxy-5-phosphonobenzenethiolsulfonate of the formula:

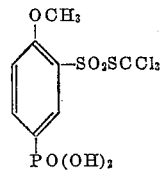

2. A method for preparing trichloromethyl 2-methoxy-5-phosphonobenzenethiolsulfonate which comprises reacting 4-methoxybenzenephosphonic acid with chlorosulfonic acid to form 3-chlorosulfonyl-4-methoxybenzenephosphonic acid, reducing the compound so-formed with sodium sulfite to form sodium 2-methoxy-5-phosphonobenzenesulfinate and reacting the compound so-formed with perchloromethylmercaptan in substantially equimolecular proportions to form the final product.

3. A nematocidal and fungicidal composition comprising an inert carrier and at least about 0.01% of trichloromethyl-2-methoxy-5-phosphonobenzenethiolsulfonate.

4. A method of controlling nematodes in the soil which comprises applying thereto trichloromethyl 2-methoxy-5-phosphonobenzenethiolsulfonate.

5. 3-Chlorosulfonyl-4-methoxybenzenephosphonic acid.

6. A compound of the formula:

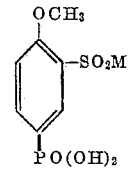

where M is selected from the group consisting of hydrogen and an alkali metal.

References Cited in the file of this patent
UNITED STATES PATENTS

| | | |
|---|---|---|
| 2,494,283 | Cassaday | Jan. 10, 1950 |
| 2,579,434 | Kenaga | Dec. 18, 1951 |
| 2,611,729 | Bartlett | Sept. 23, 1952 |
| 2,716,657 | Bretschneider | Aug. 30, 1955 |
| 2,722,539 | Anderson | Nov. 1, 1955 |
| 2,724,718 | Stiles | Nov. 22, 1955 |
| 2,807,637 | Slagh | Sept. 24, 1957 |
| 2,857,307 | Unlenbrock | Oct. 21, 1958 |
| 2,882,196 | Lamb | Apr. 14, 1959 |